US006420293B1

(12) United States Patent
Chang et al.

(10) Patent No.: US 6,420,293 B1
(45) Date of Patent: Jul. 16, 2002

(54) CERAMIC MATRIX NANOCOMPOSITES CONTAINING CARBON NANOTUBES FOR ENHANCED MECHANICAL BEHAVIOR

(75) Inventors: Sekyung Chang, Troy; Robert H. Doremus, Schenectady; Richard W. Siegel, Menands; Pulickel M. Ajayan, Clifton Park, all of NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 70 days.

(21) Appl. No.: 09/648,274

(22) Filed: Aug. 25, 2000

(51) Int. Cl.$^7$ .......................... C04B 35/80; C04B 35/52
(52) U.S. Cl. ................ 501/95.2; 501/95.1; 501/99; 501/100; 264/691
(58) Field of Search ............... 501/95.1, 95.2, 501/99, 100; 264/641

(56) References Cited

U.S. PATENT DOCUMENTS

| | | | |
|---|---|---|---|
| 5,877,110 A | 3/1999 | Snyder et al. | 502/180 |
| 5,965,470 A | 10/1999 | Bening et al. | 501/95.1 |
| 6,210,800 B1 | 4/2001 | Nesper et al. | 428/367 |
| 6,299,812 B1 | 10/2001 | Newman et al. | 264/176.1 |

FOREIGN PATENT DOCUMENTS

JP          10-88256     *   4/1998

OTHER PUBLICATIONS

R.Z. Ma, J. Wu, B.Q. Wei, J. Liang, D.H. Wu, "Processing and properties of carbon nanotubes–nano–SiC ceramic", Journal of Materials Science 33, (1998), pp. 5243–5246.

T. Kuzumaki, K. Miyazawa, H. Ichinose, K. Ito, "Processing of carbon nanotube reinforced aluminum composite", J. Mater. Res., vol. 13, No. 9, (Sep. 1998), Materials Research Society, pp. 2445–2449.

P.M. Ajayan, T.W. Ebbesen, "Nanometre–size tubes of carbon", Rep. Prog. Phys. 60 (1997), pp. 1025–1062.

L.S. Schadler, S.C. Giannaris, P.M. Ajayan, "Load transfer in carbon nanotube epoxy composites", Applied Physics Letters, vol. 73, No. 26, (Dec. 1998), pp. 3842–3844.

O. Lourie, H.D. Wagner, "Evaluation of Young's modulus of carbon nanotubes by micro–Raman spectroscopy", J. Mater, Res., vol. 13, No. 9, (Sep. 1998), Materials Research Society, pp. 2418–2422.

Sumk Lijima, "Helical microtubules of graphitic carbon", Letters to Nature, vol. 354, (Nov. 7, 1991), pp. 56–58.

* cited by examiner

Primary Examiner—Karl Group
(74) Attorney, Agent, or Firm—Heslin Rothenberg Farley & Mesiti P.C.; Mary Louise Gioeni

(57) ABSTRACT

A ceramic matrix nanocomposite having enhanced mechanical behavior is made up of a nanotube filler composed of at least one nanotube material, and a ceramic matrix composed of a nanocrystalline ceramic oxide. A method for producing ceramic articles having improved fracture toughness includes combining of a nanotube filler made up of a nanotube material and a ceramic matrix made up of a nanocrystalline ceramic oxide, forming an article therefrom, and sintering the article under elevated pressure at elevated temperature.

28 Claims, 3 Drawing Sheets

Fig. 2. XRD pattern of the composite containing 20 vol. Percent of the MWNT

US 6,420,293 B1

CERAMIC MATRIX NANOCOMPOSITES CONTAINING CARBON NANOTUBES FOR ENHANCED MECHANICAL BEHAVIOR

FIELD OF THE INVENTION

The invention relates to ceramic matrix nanocomposites containing nanotube materials.

BACKGROUND OF THE INVENTION

Ceramics are used in applications requiring strength, hardness, light weight and resistance to abrasion, erosion and corrosion, at both ambient and elevated temperatures. Examples of high temperature applications include structural parts for heat engines, including automobile engines and gas turbines; tools and dies, especially cutting tools for heat resistant alloys used in chip manufacture; and wear and/or friction surfaces. However, traditional ceramic materials are characteristically brittle, and this brittleness limits their use. Some reduction of brittleness has been obtained with fiber-reinforced ceramic matrix composites. Examples of these composites are whisker-reinforced ceramic carbides which have been used as cutting tools. Nevertheless, there continues to be a need for materials which combine the desirable properties of ceramics with improved fracture toughness.

SUMMARY OF THE INVENTION

It has been unexpectedly discovered that ceramic nanocomposites comprising nanotube fillers and nanocrystalline ceramic materials display improved fracture toughness over monolithic ceramic materials. In particular, carbon nanotubes exhibit surprising stability as fillers in nanocrystalline ceramic oxide matrixes and produce significant improvements in fracture toughness in the final composite material.

In one aspect, then, the present invention relates to a ceramic matrix nanocomposite comprising a nanotube filler comprising at least one nanotube material and a ceramic matrix comprising a nanocrystalline ceramic oxide. The nanotube material may be a carbon nanotube material, specifically a single walled, multi-walled, or surface modified carbon nanotube material. The nanocrystalline ceramic material may be a ceramic metal oxide. The metal of the ceramic metal oxide may be aluminum, titanium, zirconium, magnesium, yttrium, or cerium. In particular, the metal may be aluminum, titanium or zirconium. Specifically, the metal oxide may be alumina. The amount of nanotube filler in the nanocomposite is about 0.5 to 50 parts by volume; the amount of ceramic matrix is about 50 to 99.5 parts by volume. In particular, the amount of nanotube filler may be 1 to 20 parts by volume, and the amount of ceramic matrix about 80 to 99 parts by volume.

In another aspect, the invention relates to a method for producing ceramic articles having improved fracture toughness comprising combining a nanotube filler comprising a nanotube material and a ceramic matrix comprising at least one nanocrystalline ceramic oxide; forming an article therefrom; and sintering the article under elevated pressure at elevated temperature. The nanotube material may be a carbon nanotube material, specifically a single walled, multi-walled, or surface modified carbon nanotube material. The nanocrystalline ceramic material may be a ceramic metal oxide. The metal of the ceramic metal oxide may be aluminum, titanium, zirconium, magnesium, yttrium, or cerium. In particular, the metal may be aluminum, titanium or zirconium. Specifically, the metal oxide may be alumina. The amount of nanotube filler in the nanocomposite is about 0.5 to 50 parts by volume; the amount of ceramic matrix is about 50 to 99.5 parts by volume. In particular, the amount of nanotube filler may be 1 to 20 parts by volume, and the amount of ceramic matrix about 80 to 99 parts by volume.

In yet another aspect, the invention relates to ceramic articles comprising a ceramic matrix nanocomposite as described above. The article may be a wear surface, a bearing surface, a cutting tool, or a structural ceramic article.

In yet another aspect, the invention relates to a ceramic matrix nanocomposite comprising a nanotube filler comprising at least one nanotube material and a ceramic matrix comprising a nanocrystalline ceramic material. Where the nanotube filler is a carbon nanotube material, the nanocrystalline ceramic material may not be silicon carbide. The nanocrystalline ceramic material may be an oxide, carbide, nitride, oxycarbide, oxynitride, carbonitride, oxycarbonitride, carbonate, phosphate or a mixture thereof. In particular, the nanocrystalline ceramic material may be a metal oxide, a metal carbide, a metal nitride, a metal oxycarbide, a metal oxynitride, a metal carbonitride or a mixture of the above. The amount of nanotube filler in the ceramic matrix nanocomposite is about 0.5 to 50 parts by volume; the amount of nanocrystalline ceramic material is about 50 to 99.5 parts by volume. Specifically, the amount of nanotube filler may be 1 to 20 parts by volume; the amount of nanocrystalline ceramic material may be about 80 to 99 parts by volume. In particular, the ceramic matrix nanocomposite may comprise about 1 to 20 parts by volume of a multi-walled carbon nanotube material, and about 80 to 99 parts by volume of a nanophase alumina.

DETAILED DESCRIPTION OF THE INVENTION

Figure 1:
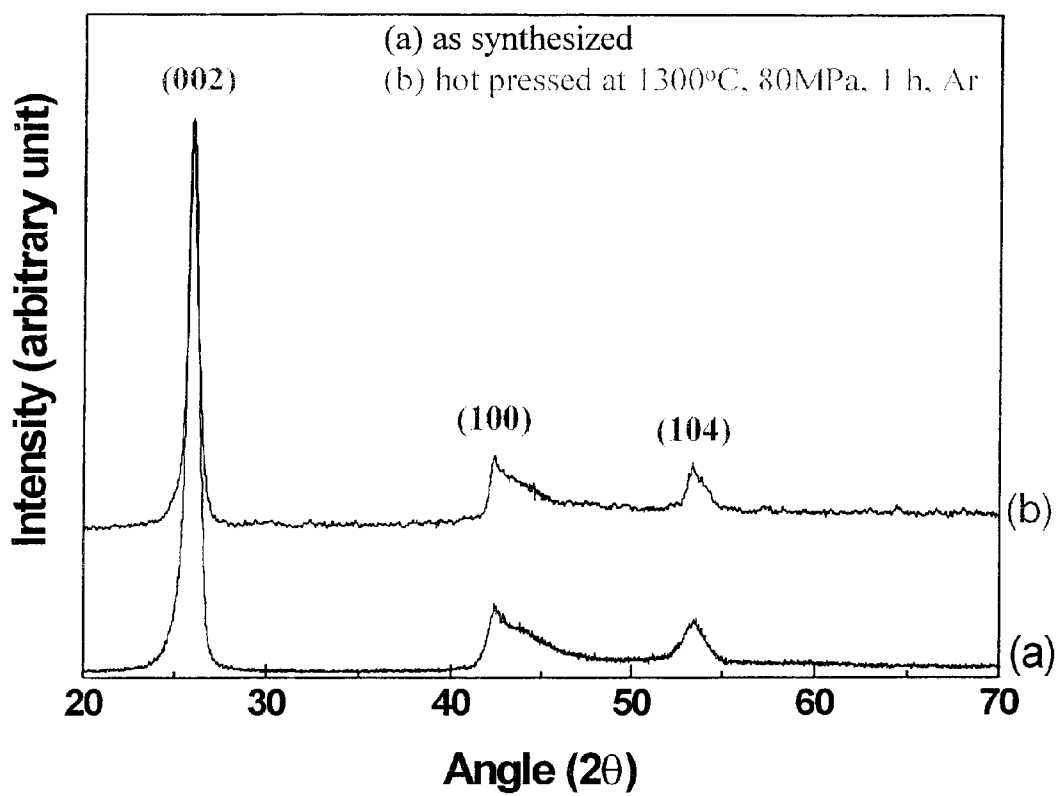
FIG. 1 is an x-ray diffraction pattern of a multi-walled carbon nanotube (MWNT) sample before (curve (a)), and after (curve (b)), hot pressing at 80 MPa at 1300° C. in argon for one hour.

As generally described above, the present invention is directed to ceramic matrix nanocomposites which exhibit improved mechanical properties, particularly increased fracture toughness, and to the manufacture of articles which exhibit such improvements, using these nanocomposites.

A nanocomposite is a composite prepared from at least one starting material which is a nanomaterial. "Nanomaterial" is defined herein as a material having an average particle or grain size between 1 and 100 nanometers, or having at least one dimension such as length or diameter between 1 and 100 nanometers. A composite material typically comprises a matrix or continuous phase and a reinforcing or discontinuous phase. In some cases, the two or more phases may be bicontinuous or multicontinuous. The reinforcing phase, which is termed "filler" herein, is typically combined with, and hence disposed within, the matrix phase, the two phases typically being heated to form a composite material. In some cases, a nanocomposite material may be formed by cold pressing, rather than heat treatment. The ceramic matrix nanocomposites of the present invention comprise a nanotube filler and a ceramic matrix. Both components of the nanocomposite are nanomaterials, at least to begin with. The matrix may be coarsened by subsequent heat treatment.

The term "nanotube," as used herein, refers to a particulate nanomaterial having a cylindrical or tubular configuration; the term 'nanowire' has also been used to refer to the same or similar materials. Nanotube fillers useful in the present invention comprise nanotube materials such as carbon nanotubes, both single-walled (SWNT) and multi-walled (MWNT) and inorganic nanotubes. The inorganic nanotubes have been prepared from a range of materials including boron nitride, silicon nitride, silicon carbide, dichalcogenides, for example, $WS_2$, oxides such as $MoO_3$ and materials having a composition $B_xC_yN_z$, where x, y, and z are independent 0 to 4, for example, $BC_2N_2$ and $BC_4N$. The nanotube material may also comprise a mixture of these nanomaterials. The average particle diameter of the nanotubes is approximately 1–100 nm. For example, SWNT typically have an average diameter of 1–2 nm, and for MWNT average diameter is typically about 2–30 nm. The nanotubes have a very high aspect ratio, that is, ratio of length to diameter, typically ranging from 25 to 1,000,000. It should be noted that numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, or time, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Carbon nanotubes are commonly prepared by an electric arc process. This method and other methods for the synthesis of carbon nanotubes are reviewed by P. M. Ajayan and T. W. Ebbesen in "Nanometre-Size Tubes of Carbon," Rep. Prog. Phys., 60, 1025–1062 (1997). Inorganic nanotubes may be synthesized using similar methods.

The surface of carbon nanotubes or particles may be also modified prior to incorporation in the nanocomposites of the present invention. For example, heating of carbon nanotube materials at elevated temperature in an oxidizing environment typically results in chemical changes in the surface of the particles, although, unexpectedly, this apparently does not occur when carbon nanotubes are used as fillers for nanocrystalline ceramic oxides in the nanocomposites of the present invention. Specifically, heating in air at 640° C. results in the formation of carboxyl and carbonyl groups at the particle surface. Another known method for modifying the surface of carbon nanotubes particles is in situ vapor phase coating with metal ions; $V_2O_5$ has been used for this purpose. It is also known to introduce defects on the surface of the particles. These methods are described by P. M. Ajayan, et al. ("Carbon Nanotubes as Removable Templates for Oxide Nanocomposites and Nanostructures", Nature, 375, 564 (1995)). Other methods of modifying the surface of carbon nanotube particles may be used.

The nanocrystalline ceramic materials, or nanophase ceramic powders, found to be useful as starting materials for fabricating the ceramic matrix nanocomposites of the present invention which exhibit increased toughness over the monolithic form of the ceramic material include: nanocrystalline ceramic oxides, nitrides, carbides, carbonitrides, oxynitrides and oxycarbonitrides, and mixtures thereof. Where carbon nanotubes are used as the nanotube filler, the ceramic matrix material may not be silicon carbide. In particular, the nanocrystalline ceramic materials may be nanocrystalline ceramic oxides, specifically metal oxides. Examples of ceramic metal oxides are magnesium oxide, yttrium oxide, cerium oxide, alumina, titania, and zirconia. Other preferred nanocrystalline ceramic materials are metal nitrides, metal carbides, metal carbonitrides, metal oxynitrides, metal oxycarbonitrides, or mixtures thereof. The metal of these nanocrystalline ceramic compounds may be aluminum, titanium, zirconium, magnesium, yttrium, or cerium; in particular, the metal may be aluminum or titanium. A particularly useful nanocrystalline ceramic material is alumina. Non-metals useful as nanocrystalline ceramic oxides, nitrides, carbides, carbonitrides, oxynitrides and oxycarbonitrides include calcium, silicon and germanium, and particularly silicon. Examples of non-metal nanocrystalline ceramic materials are silicon carbide and silicon nitride. Semimetals useful as nanocrystalline ceramic oxides, nitrides, carbides, carbonitrides, oxynitrides and oxycarbonitrides include bismuth and beryllium. Examples of non-metal nanocrystalline ceramic oxides are bismuth oxide and beryllium oxide. Mixed compounds such as SiAlON, calcium aluminate, mullite ($Al_2O_3.SiO_2$), and spinel ($MgO.Al_2O_3$) may be used. Ceramic carbonates and phosphates, such as hydroxyapatite, are also useful.

Grain size of the nanophase ceramic matrix starting material is typically about 1 to 100 nm. Preferably grain size ranges from about 10 to 50 nm. Grain size may increase during processing, especially as a result of heating, so that the resulting grain size of the ceramic matrix is greater than 100 nm. These materials are considered nanocomposites within the context of the present invention, since the starting materials are nanomaterials.

In accordance with the present invention, the ceramic matrix nanocomposites are prepared by forming a mixture or blend of ceramic powder or particulates with a nanotube filler dispersed in the mixture, typically uniformly dispersed. The amount of nanotube filler may range from about 0.5 to 50 parts by volume, and particularly from about 1 to 20 parts per volume, while the nanocrystalline ceramic material may range from about 50 to 99.5 parts by volume, and particularly from about 80 to 99 parts per volume. Blending of nanotube fillers with nanocrystalline ceramic materials can be accomplished by any suitable mixing technique which will provide a dispersion of the filler in the ceramic matrix powder. Typically, a homogeneous dispersion, with minimal agglomeration and clumping, is prepared. For example, suitable mixtures may be formed by dispersing the components, individually or as a mixture, in a mixing medium with an ultrasonic probe, blending the dispersions, if the components are dispersed individually, and evaporating the solvent in an ultrasonic bath. Dry mixing or mixing with other volatile media may be satisfactorily utilized. Upon completing the mixing operation, the mixture may be formed into a suitable article configuration and hot pressed to achieve a substantially maximum density of the material. If desired, cold pressing may be used, rather than hot pressing. Hot isostatic pressing, at super atmospheric pressure, or sintering at elevated pressure, is carried out at elevated temperature. The temperature for hot pressing or sintering depends on the melting point of the ceramic matrix material, and is typically in excess of about 400° C., particularly in excess of 800° C. For example, alumina/MWNT nanocomposites are sintered by hot pressing at about 1300° C.

The ceramic matrix nanocomposites of the present invention are useful in many applications requiring excellent hardness, strength and fracture toughness. Ceramic articles composed of a ceramic matrix nanocomposite may be used as a wear surface, a bearing surface, a cutting tool or a load-bearing structural article, such as a prosthetic device. Ceramic cutting tools are described in U.S. Pat. Nos. 5,449,647 and 5,980,988. Articles having a ceramic wear surface and a ceramic bearing surface are described in U.S. Pat. Nos. 5,985,205 and 5,361,740, respectively. The disclosures of these patents are hereby incorporated by reference in their entirety. Prosthetic devices composed of titania and techniques for fabricating the same are known; these fabrication techniques may be used to produce a prosthetic composed of a ceramic matrix nanocomposite according to the present invention.

EXAMPLE 1
Stability of Carbon Nanotubes to Fabrication Conditions

To investigate the stability of the MWNT during hot pressing, 0.1 g of MWNT was hot pressed at 80 MPa at 1300° C. in argon for 1 hour. X-ray analysis was performed on the hot pressed MWNT and on the as-made MWNT using a Philips CRG 300 diffractometer with Cu $K_\alpha$ radiation.

X-ray diffraction patterns shown in FIG. 1 reveal the structure of the as-made MWNT (FIG. 1-($a$)), and hot pressed MWNT (FIG. 1-($b$)). For the as-made MWNT, there was a peak for the (002) planes at 25.98° (2θ). The d-spacing of 0.343 nm for the line from the (002) planes was slightly larger than the 0.335 nm for graphite (JCPDS file; 26-1079). The x-ray line width for the (002) planes of the MWNT was $B_m$=0.7° (2θ), and for the (012) planes of an α-alumina standard it was $B_s$=0.17°. (2θ). These values were used to calculate an average diameter (or thickness) of the MWNT with the "Scherrer formula", t=(0.9*λ)/(B*cos $θ_B$), where t is the thickness of the particle, λ is the x-ray wavelength, B is the peak width at half of maximum intensity, and $θ_B$ is the diffraction angle. The average diameter of the MWNT was about 12 nm based on the Scherrer formula. The x-ray structures of the MWNT samples that were heat treated and hot pressed were essentially the same as those as-synthesized, indicating that the MWNTs were stable during hot pressing. The lengths of MWNT ranged from 0.3 to 0.8 μm as measured by TEM.

EXAMPLE 2
Fabrication of Alumina//MWNT Composite

Alumina powder, γ-phase, 23 nm grain size, obtained from Nanophase Technologies Corporation, Burr Ridge, Ill., was transformed to the α-phase by heat treatment for 7 min. in a box furnace in air at 1300° C. Resulting grain size of the α-phase alumina powder was about 44 nm. MWNT was synthesized by an electric arc process.

The α-alumina powder was mixed with 5 to 20 volume % MWNT, and the resulting mixture was dispersed in ethanol with an ultrasonic probe for about 40 min. The mixture was held in the ultrasonic bath until most of the ethanol evaporated and then the mixture was dried at 75° C. for 24 hrs. The weakly agglomerated mixture was ground and remixed in an agate mortar and pestle and then dried at 130° C. for 12 hrs. The alumina-MWNT mixtures were sintered by hot pressing in a graphite die at 1300° C., at a pressure of 60 MPa, for 1 hr. in an Ar atmosphere, resulting in monolithic alumina (0 volume % MWNT) and alumina matrix composites with 5–20 vol % MWNT.

Density of the composites was measured by the Archimedes method, and theoretical density was calculated. Percent theoretical density was determined, using the formula: % theoretical density=100×measured density/theoretical density. X-ray analysis was performed on the composites to reveal any possible new phases from the interaction between the alumina and the MWNT. The surface of the composites was polished with 1 μm diamond paste and then 0.3 μm alumina powder. The hardness of the composites was measured using a micro-Vickers hardness indenter (Model M-400, Leco Co.) with a 1 kg load applied on the surface for 10 seconds. To measure the fracture toughness, $K_c$, of the composites, a Vickers hardness tester (Vickers Limited) with a load of 5 kg was used, and the fracture toughness was calculated by the "Evans & Charles" equation ($K_c$=0.00824*(P/C$^{1.5}$), where P is equal to the applied load in Newtons and C is equal to the crack length in meters). The microstructure of the composite containing 10 volume % of MWNT was investigated in ultramicrotomed sections by TEM (JEOL 4000), and by SEM (JEOL-A40) to observe the fracture surfaces of the composite.

Results appear in Table 1. The table shows that the hot pressed alumina had 97.8% of theoretical density, whereas the composite containing 5 volume % MWNT had a density of 99.8% of the theoretical value. The density of the composites decreased with increasing content of the MWNT; 20 volume % MWNT gave 97.9% of the theoretical density.

TABLE 1

| % MWNT | Vickers Hardness, GPa | Fracture Toughness, MPa · m½ | Actual Density | % of Theoretical Density |
| --- | --- | --- | --- | --- |
| 0 | 18.3 | 3.4 | NA | 97.8 |
| 5 | 17.5 | NA | 3.87 | 99.8 |
| 10 | 16.1 | 4.2 | 3.77 | 98.9 |
| 15 | 14.5 | NA | 3.67 | 98.9 |
| 20 | 13.6 | NA | 3.58 | 97.9 |

Figure 2:
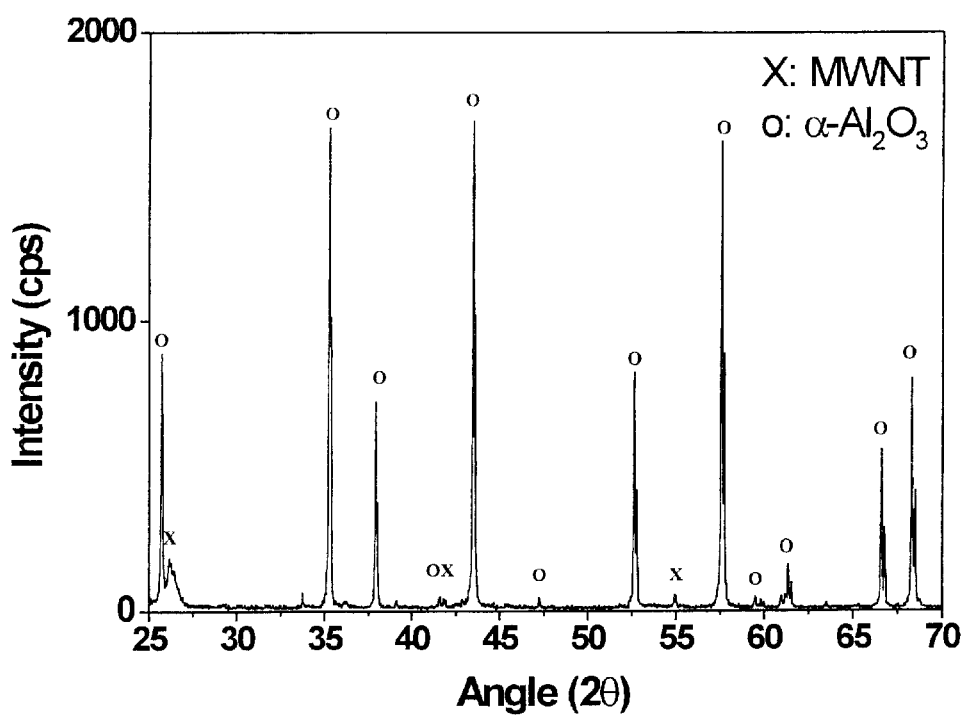
FIG. 2 is an x-ray diffraction pattern of a nanocomposite of composition 20 volume % MWNT and 80 volume % nanophase alumina, showing only peaks attributable to α-alumina and MWNT and indicating the stability of the nanotubes in the composite.

FIG. 2 shows an x-ray diffraction pattern obtained from the composite containing 20 volume % MWNT. The pattern shows only α-phase alumina and MWNT, without any new phases. This indicates the stability of the nanotubes in the composites.

The Vickers hardness of the composites decreased with increasing content of MWNT. Fracture toughness was determined for the hot pressed alumina and the composite containing 10 volume % MWNT. The addition of 10 volume % MWNT increased the fracture toughness by about 24%, from 3.4 to 4.2 MPa·m$^{1/2}$. For the composites that contained at least 15 volume % MWNT, fracture toughness was difficult to measure because of irregular shapes of the cracks and problems such as cracks coming from fewer than four corners and no cracks around regions of aggregated nanotubes.

Figure 3:
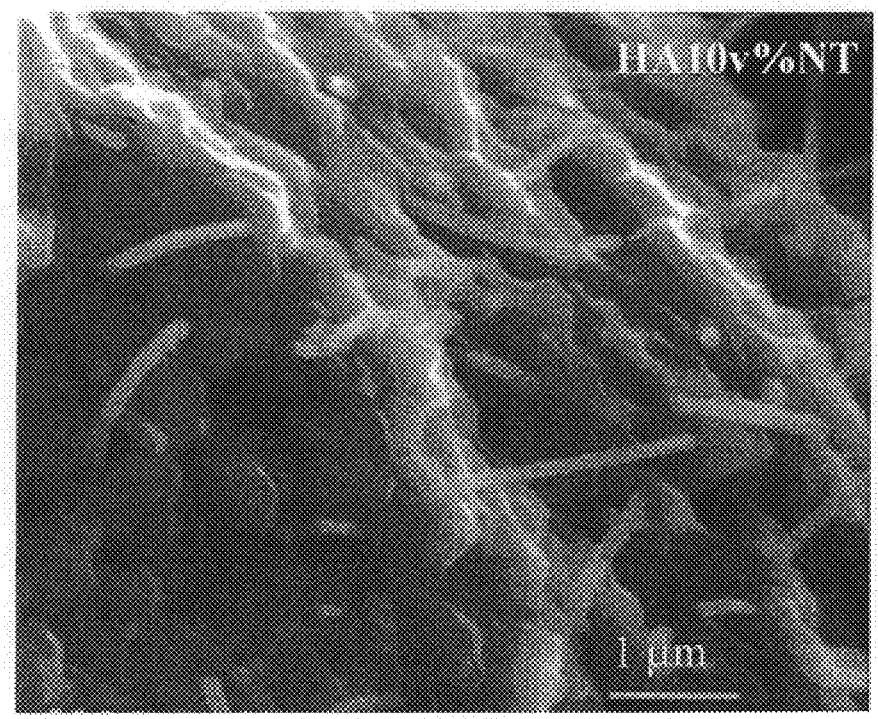
FIG. 3 is a scanning electron micrograph of a fracture surface from a nanocomposite containing 10 volume % MWNT.

After breaking the composites into two parts, fracture surfaces were investigated by SEM. A micrograph of the fracture surface of a composite containing 10 volume % MWNT is shown in FIG. 3. The MWNT were reasonably well dispersed in the composites. Even though the composite was broken apart, the MWNT were still partially embedded in the alumina matrix. The nanotubes clearly survived the processing and sintering process.

What is claimed is:

1. A ceramic matrix nanocomposite comprising a nanotube filler and a ceramic matrix, said nanotube filler comprising at least one nanotube material, and said ceramic matrix comprising a nanocrystalline ceramic oxide.

2. The ceramic matrix nanocomposite of claim 1, wherein said nanotube material is a carbon nanotube material.

3. The ceramic matrix nanocomposite of claim 2, wherein said carbon nanotube material is a multi-walled carbon nanotube material.

4. The ceramic matrix nanocomposite of claim 2, wherein said nanotube material is a single-walled carbon nanotube material.

5. The ceramic matrix nanocomposite of claim 2, wherein said nanotube material is a surface-modified carbon nanotube material.

6. The ceramic matrix nanocomposite of claim 1, wherein said nanocrystalline ceramic metal oxide is selected from the group consisting of nanocrystalline ceramic metal oxides of aluminum, titanium, zirconium, magnesium, yttrium, and cerium.

7. The ceramic matrix nanocomposite of claim 1, wherein said nanocrystalline ceramic metal oxide is selected from the group consisting of nanocrystalline ceramic metal oxides of aluminum, titanium and zirconium.

8. The ceramic matrix nanocomposite of claim 1, wherein said nanocrystalline ceramic metal oxide is alumina.

9. A ceramic matrix nanocomposite according to claim 1, comprising:
    about 0.5 to 50 parts by volume of a nanotube filler comprising at least one nanotube material; and
    about 50 to 99.5 parts by volume of a ceramic matrix comprising at least one nanocrystalline ceramic oxide.

10. A ceramic matrix nanocomposite according to claim 1, comprising:
    about 1 to 20 parts by volume of a nanotube filler comprising at least one nanotube material; and
    about 80–99 parts by volume of ceramic matrix comprising at least one nanocrystalline ceramic oxide.

11. A method for producing ceramic articles having improved fracture toughness comprising:
    combining a nanotube filler comprising at least one nanotube material and a ceramic matrix comprising at least one nanocrystalline ceramic oxide;
    forming an article therefrom; and
    sintering the article under elevated pressure at elevated temperature.

12. A method according to claim 11, wherein said nanotube material is a carbon nanotube material.

13. A method according to claim 12, wherein said carbon nanotube material is a multi-walled carbon nanotube material.

14. A method according to claim 12, wherein said nanotube material is a single-walled carbon nanotube material.

15. A method according to claim 12, wherein said nanotube material is a surface-modified carbon nanotube material.

16. A method according to claim 11, wherein said nanocrystalline ceramic metal oxide is selected from the group consisting of nanocrystalline ceramic metal oxides of aluminum, titanium, zirconium, magnesium, yttrium, and cerium.

17. A method according to claims 11, wherein said nanocrystalline ceramic material is alumina.

18. A ceramic article comprising a ceramic matrix nanocomposite according to claim 1.

19. A ceramic article according to claim 18, wherein said article comprises a wear surface.

20. A ceramic article according to claim 18, wherein said article comprises a bearing surface.

21. A ceramic article according to claim 18, wherein said article comprises a cutting tool.

22. A ceramic article according to claim 18, wherein said article comprises a structural ceramic article.

23. A ceramic matrix nanocomposite comprising:
    a nanotube filler comprising at least one nanotube material; and
    a ceramic matrix comprising a nanocrystalline ceramic material, with the proviso that where the nanotube filler is a carbon nanotube material, the nanocrystalline ceramic material may not be silicon carbide.

24. The ceramic matrix nanocomposite of claim 23, wherein said nanocrystalline ceramic material is selected from the group consisting of selected from the group consisting of oxides, carbides, nitrides, oxycarbides, oxynitrides, carbonitrides, oxycarbonitrides, carbonates, phosphates, and mixtures thereof.

25. The ceramic matrix nanocomposite of claim 23, wherein said nanocrystalline ceramic material is selected from the group consisting of metal oxides, metal carbides, metal nitrides, metal oxycarbides, metal oxynitrides, metal carbonitrides, metal carbonates, metal phosphates, and mixtures thereof.

26. A ceramic matrix nanocomposite according to claim 23, comprising:
    about 0.5 to 50 parts by volume of a nanotube filler comprising at least one nanotube material; and
    about 50 to 99.5 parts by volume of at least one nanocrystalline ceramic material.

27. A ceramic matrix nanocomposite according to claim 23, comprising:
    about 1 to 20 parts by volume of a nanotube filler comprising at least one nanotube material; and
    about 80–99 parts by volume of at least one nanocrystalline ceramic material.

28. A ceramic matrix nanocomposite comprising:
    about 1 to 20 parts by volume of a multi-walled carbon nanotube material; and
    about 80 to 99 parts by volume of a nanocrystalline alumina.

* * * * *

UNITED STATES PATENT AND TRADEMARK OFFICE
CERTIFICATE OF CORRECTION

PATENT NO. : 6,420,293 B1  Page 1 of 1
APPLICATION NO. : 09/648274
DATED : July 16, 2002
INVENTOR(S) : Chang et al.

It is certified that error appears in the above-identified patent and that said Letters Patent is hereby corrected as shown below:

Specification:

Col. 1, line 5, insert the following:

--The following invention was made with Government support under contract number DAAD 16-00-C-9237 awarded by the United States Department of the Army. The Government has certain rights.--

Signed and Sealed this

Eleventh Day of July, 2006

JON W. DUDAS
*Director of the United States Patent and Trademark Office*